(12) United States Patent
Rai et al.

(10) Patent No.: US 10,805,091 B2
(45) Date of Patent: Oct. 13, 2020

(54) CERTIFICATE TRACKING

(71) Applicant: SAP SE, Walldorf (DE)

(72) Inventors: Pavan Kiran Rai, Kasaragod (IN);
Sajid Thalam Kandathil, Kozhikode (IN)

(73) Assignee: SAP SE, Walldorf (DE)

( * ) Notice: Subject to any disclaimer, the term of this patent is extended or adjusted under 35 U.S.C. 154(b) by 254 days.

(21) Appl. No.: 15/581,402

(22) Filed: Apr. 28, 2017

(65) Prior Publication Data
US 2018/0316510 A1 Nov. 1, 2018

(51) Int. Cl.
*H04L 9/32* (2006.01)
*H04L 9/00* (2006.01)
*H04L 29/06* (2006.01)

(52) U.S. Cl.
CPC ............ *H04L 9/3268* (2013.01); *H04L 9/006* (2013.01); *H04L 63/0281* (2013.01); *H04L 63/0428* (2013.01)

(58) Field of Classification Search
CPC .................................................... H04L 9/3268
USPC ........................................................ 713/158
See application file for complete search history.

(56) References Cited

U.S. PATENT DOCUMENTS

| | | | |
|---|---|---|---|
| 7,461,250 B1* | 12/2008 | Duane .................. | H04L 9/3263 713/157 |
| 7,650,496 B2* | 1/2010 | Thornton ............ | H04L 63/0823 713/158 |
| 9,819,496 B2* | 11/2017 | Lin ......................... | H04L 29/06 |
| 2009/0307142 A1* | 12/2009 | Mardikar .......... | G06Q 20/1085 705/72 |
| 2011/0191581 A1* | 8/2011 | Shim ...................... | H04L 67/12 713/158 |
| 2015/0256345 A1* | 9/2015 | Vaid ..................... | H04L 9/3268 713/158 |
| 2015/0347734 A1* | 12/2015 | Beigi ..................... | G06F 21/32 713/155 |
| 2019/0074982 A1* | 3/2019 | Hughes ................ | H04L 9/3268 |

* cited by examiner

*Primary Examiner* — Khalil Naghdali
(74) *Attorney, Agent, or Firm* — Sterne, Kessler, Goldstein & Fox P.L.L.C.

(57) ABSTRACT

Disclosed herein are system, method, and computer program product embodiments for certificate tracking. An embodiment operates by a computer implemented method that includes receiving, by at least one processor of a certificate manager, a first request from a client device and sending a second request for a root certificate to a certificate authority. The method further includes receiving the root certificate from the certificate authority and sending a third request to the certificate authority for one or more additional certificates. The method further includes receiving the one or more additional certificates from the certificate authority and storing the root certificate and the one or more additional certificates. The certificate manager and the certificate authority can be located on different networks.

19 Claims, 7 Drawing Sheets

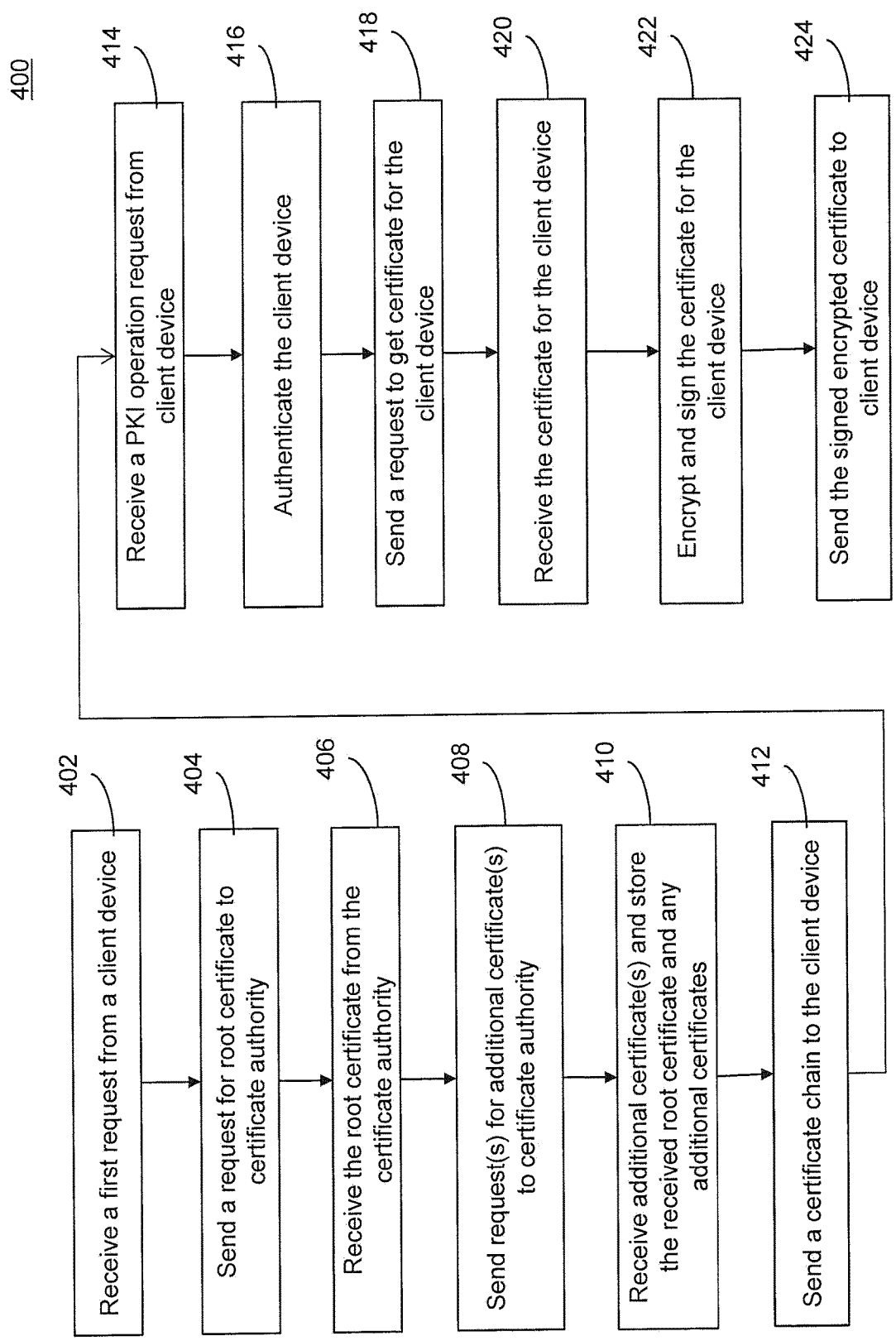

CERTIFICATE TRACKING

BACKGROUND

Mobile device management systems allow an organization to secure and manage the organization's mobile devices, mobile applications, data, etc. A mobile device management system allows authorized users to remotely connect to mobile devices enrolled with the mobile device management system in order to, for example, configure and use the device and install required applications.

BRIEF DESCRIPTION OF THE DRAWINGS

The accompanying drawings are incorporated herein and form a part of the specification.

FIG. 4 is a flowchart for a method describing exemplary operations of certificate manager, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, to provide a general solution for certificate tracking.

Figure 1:
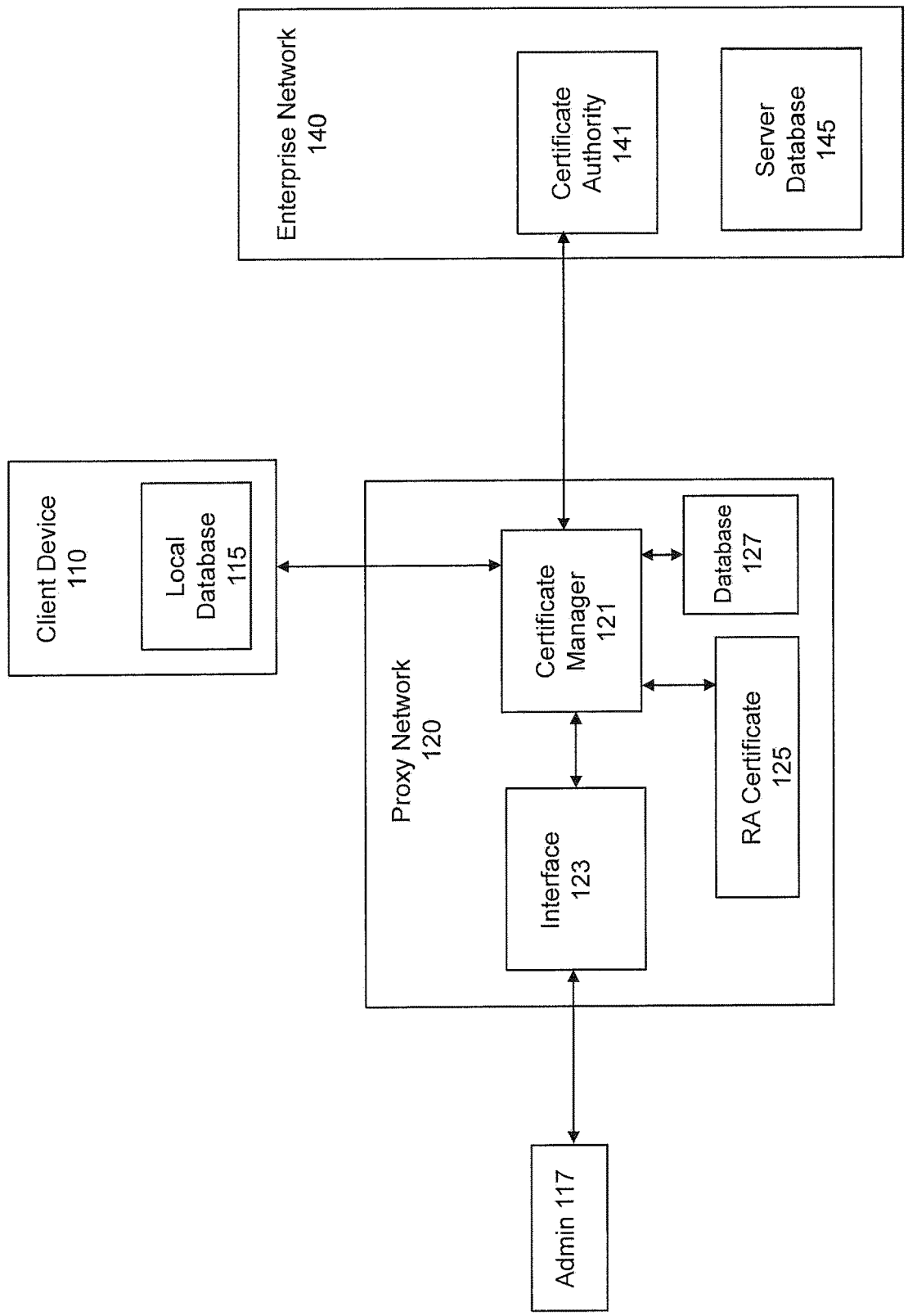
FIG. 1 is an illustration of an exemplary mobile device management system, according to some embodiments.

FIG. 1 is an illustration of an exemplary mobile device management system 100 in which embodiments described herein can be implemented. System 100 includes a client device 110 that can be communicatively coupled to certificate manager 121 through proxy network 120. In addition to certificate manager 121, proxy network 120 can also include an interface 123 and RA certificate 125. An admin 117 can be communicatively coupled to certificate manager 121 through interface 123. System 100 also includes an enterprise network 140, which can include certificate authority 141 and server database 145.

Client device 110 can be any type of computing device having one or more processors, a user input (for example, a touch-screen, mouse, 3-dimensional (3D) mouse, QWERTY keyboard, microphone, etc.), and a communications infrastructure capable of receiving and transmitting data over a network. For example, computing device 110 can include, but is not limited to, a mobile phone or other mobile device, a personal digital assistant (PDA), a computer, a cluster of computers, a set-top box, or other similar type of device capable of processing instructions and receiving and transmitting data to and from humans and other computing devices.

Similarly, certificate manager 121 and/or certificate authority 141 can be any type of server or computing device capable of serving data to client device 110.

Enterprise network 140 can be any network or combination of networks that can carry data communication. Such network can include, but is not limited to, a wired (e.g., Ethernet) or a wireless (e.g., Wi-Fi, 3G, 4G, 5G, etc.) network. In addition, enterprise network 140 can include, but is not limited to, a local area network, medium area network, and/or wide area network. Enterprise network 140 can support protocols and technology including, but not limited to, Internet or World Wide Web protocols and/or services. Intermediate network routers, gateways, or servers may be provided between components of system 100 depending upon a particular application or environment. According to some embodiments, enterprise network 140 can include an enterprise's communications backbone that allows devices and applications along different departments and/or workgroups be connected and facilitates data accessibility. Although not shown, enterprise network 140 can include different servers such as, but not limited to, short message service (SMS) gateway(s), simple mail transfer protocol (SMTP) gateway(s), enrollment server(s), etc. According to some examples, enterprise network 140 can include a private network, which is not accessible to public.

In an embodiment, enterprise network 140 includes a server database 145. Server database 145 may store, for example and without limitation, any type of data that is accessible by enterprise network 140. Although only server database 145 is shown, additional databases may be used as necessary. For example, server database 145 can include a cloud database that can run, for example, on a cloud computing platform. In an embodiment, local database 115 is used to store data accessible by client device 110. For example, local database 115 may be implemented using any type of recording medium coupled to an integrated circuit that controls access to the recording medium. The recording medium can be, for example and without limitation, a semiconductor memory, a hard disk, or other similar type of memory or storage device. Moreover, local database 115 may be integrated within client device 110 or a stand-alone device communicatively coupled to client device 110 via a direct connection. For example, local database 115 may include an internal memory device of client device 110, a compact flash card, a secure digital (SD) flash memory card, or other similar type of memory device.

In an example, client device 110 may suffer from limitations such as reduced memory capabilities when compared to enterprise network 140. Therefore, data stored at local database 115 may include, but is not limited to, a subset of data found at server database 145. For example, local database 115 and server database 145 may each be relational databases. In an embodiment, the data stored at local database 115 can be synchronized with server database 145 over network 140.

Enterprise network 140 can also include certificate authority 141. Certificate authority 141 can be any type of server or computing device capable of serving data to client device 110. In some embodiments, certificate authority 141 can be configured to issue digital certificates, which can, for example, certify the ownership of a public key associated with the owner of the certificate. The digital certificates can be used to secure connections between devices and servers on, for example, enterprise network 140.

Proxy network 120 can be any network or combination of networks that can carry data communication. Such network can include, but is not limited to, a wired (e.g., Ethernet) or a wireless (e.g., Wi-Fi, 3G, 4G, 5G, etc.) network. In addition, proxy network 120 can include, but is not limited to, a local area network, medium area network, and/or wide area network. Proxy network 120 can support protocols and technology including, but not limited to, Internet or World Wide Web protocols and/or services. Intermediate network routers, gateways, or servers may be provided between components of system 100 depending upon a particular application or environment. According to some embodiments, proxy network 120 is separate and different than enterprise network 140. Proxy network 120 can include relay or proxy servers to, for example, enforce firewall rules and receive device communication before relaying it to a server (e.g., certificate authority 141) on enterprise network 140. Proxy network 120 can include different servers such as, but not limited to, database server(s) 127. According to some examples, proxy network 120 can include a network accessible to public (e.g., a public exposed network such as, but not limited to, a cloud, a demilitarized zone, etc.)

In an embodiment, proxy network 120 includes a certificate manager 121, an interface 123, and RA certificate 125. According to some embodiments, interface 123 can include a web interface (such as a web interface for management), which can facilitate the interaction between admin 117 and certificate manger 121. It is noted that interface 123 can include any type of interface. Also, it is noted that although interface 123 is shown as part of proxy network 120, interface 123 can be on enterprise network 140. Additionally or alternatively, interface 123 can be part of another network. According to some examples, interface 120 can distributed over one or more of proxy network 120, enterprise network 140, other networks, or a combination thereof.

In some embodiments, certificate manager 121 can be a centralized certificate manager. Additionally or alternatively, certificate manager 121 can be designed and operated as a distributed certificate manager located on and/or distributed among one or more networks. For example, certificate manager 121 can be designed to operate on a cloud. In some embodiments, and as discussed in more detail below, certificate manager 121 is configured to track and manage certificates that has been issued for client devices such as client device 110. In these examples, certificate manager 121 can act as a proxy for certificate authority 141. Therefore, certificate authority 141 can be maintained in enterprise network 140 (e.g., a private network) while certificate manager 121 is on proxy network 120 (e.g., a network accessible to public (e.g., a public exposed network such as, but not limited to, a cloud, a demilitarized zone, etc.)). In these examples, certificate manager 121 can be configured to hide certificate authority 141 from external entities. According to some examples, the connection between certificate manager 121 and certificate authority 141 is a secured connection such that certificate authority 141 can be protected.

According to some examples, certificate manager 121 is further configured to validate incoming certificate requests from, for example, client device 110. Additionally or alternatively, certificate manager 121 can be configured to validate certificates that are issued from certificate authority 141. According to some examples, certificate manager 121 can also be configured to renew certificates. For example, certificate manager 121 can be configured to store expiration information associated with the certificates and can be configured to renew (e.g., auto-renew) the certificates based on the expiration data.

Additionally or alternatively, certificate manager 121 can be configured to revoke one or more certificate for a particular device. According to some embodiments, certificate manager 121 can store a mapping between the client devices and/or users of the client device and the certificates in, for example, database 127. By storing the mapping, certificate manager 121 can be configured to track the certificates and the client devices using the certificates. When certificate manager 121 receives information that a client device's certificate is to be revoked (for example, the device is lost, the user of the device is leaving the enterprise, etc.) certificate manager 121 can use the stored mapping (e.g., stored in database 127) to determine the certificate and to revoke the determined certificate. It is noted that although system 100 is illustrated to include database 127, proxy network 120 can include one or more databases and/or any other data storage devices configured to store any type of data.

Figure 2:
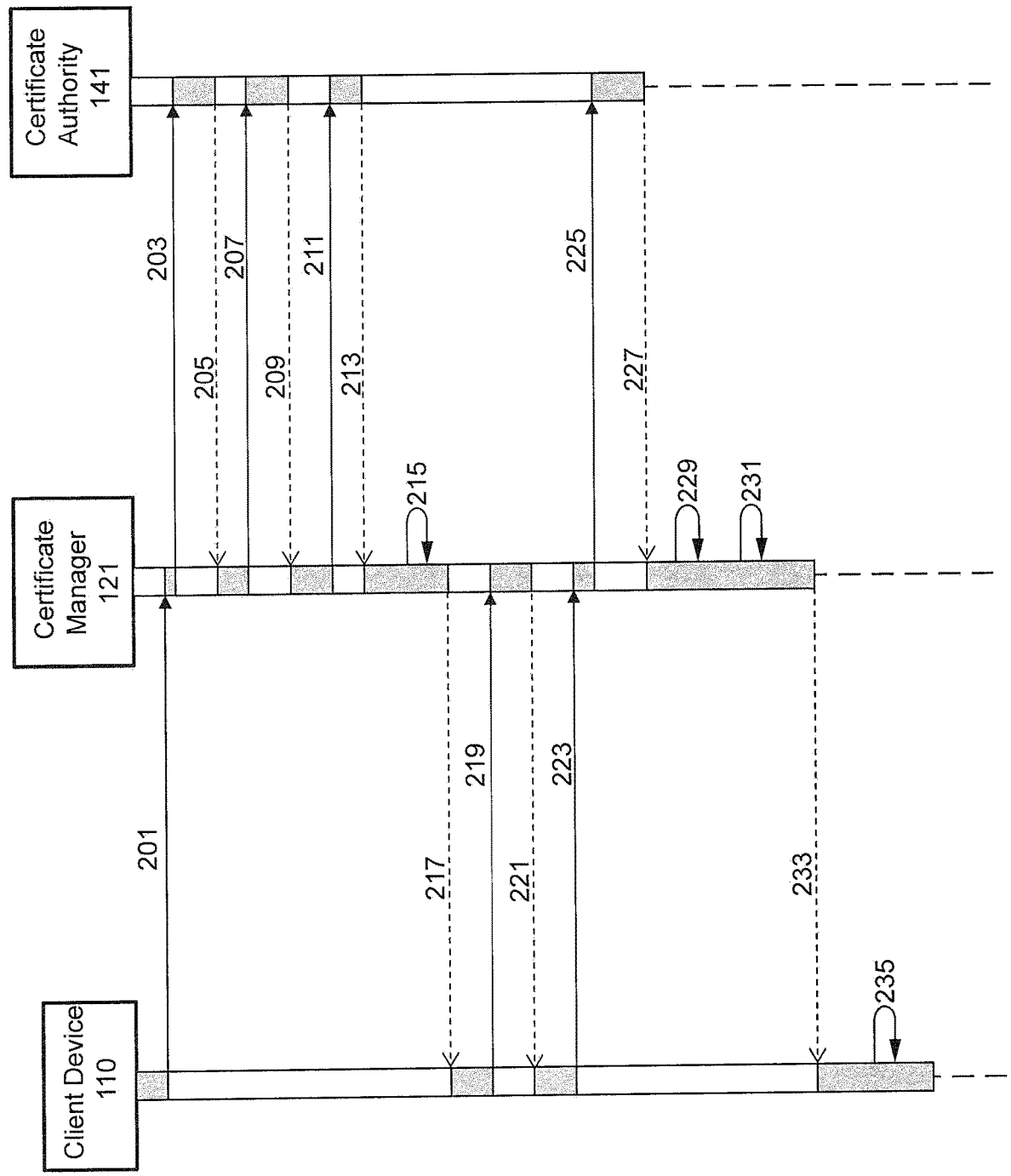
FIG. 2 is a sequence diagram describing exemplary operations of certificate manager, according to some embodiments.

FIG. 2 is a timing/sequence diagram 200 describing exemplary operations of certificate manager, according to some embodiments. The operations represented by diagram 200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

According to some embodiments, timing diagram 200 illustrates the interaction between client device 110, certificate manager 121, and certificate authority 141. Timing diagram 200 shall be described with reference to FIGS. 1 and 2. However, timing diagram 200 is not limited to these example embodiments.

Client device 110 sends a request 201 to certificate manager 121. According to some embodiments, request 201 can include a get certificate authority (CA) certificate request. According to some examples, request 201 starts the process for certificate manager 121 to gain its authority to act as the proxy to certificate authority 141. After receiving the request 201, certificate manager 121 can send request 203 to certificate authority 141. According to some embodiments, request 203 can include a request to get root certificate. In one example, the request to get the root certificate can be sent by certificate manager 121 using a Microsoft Native call. However, it is noted that request 203 and/or any request for root certificate can be done using other technologies and service.

After receiving request 203, certificate authority 141 sends the root certificate 205 to certificate manager 121. According to some embodiments, certificate authority 141 can be configured to issue certificates in a form of a tree structure. A root certificate can be the top certificate of the three (e.g., a private key which can be used to "sign" other certificates). According to some examples, root certificate can include public information.

According to some examples, after receiving root certificate 205, certificate manager 121 can send two additional requests to certificate authority 141 for two additional certificates. In some embodiments, the two additional certificates are registration authority (RA) certificates. Registration authority (RA) is part of public key infrastructure (PKI) that can assure valid and correct registration. In some embodiments of PKI, an RA is responsible for accepting requests for digital certificates and authenticate the entity that makes the request. For example, certificate manager 121 can send request 207 to certificate authority 141. According to some embodiments, request 207 can include a request for an Exchange Enrollment Agent (EEA) certificate. In response, certificate authority 141 is configured to send an RA-EEA certificate 209 back to certificate manage 121.

After receiving RA-EEA certificate 209, certificate manager 121 can send request 211 to certificate authority 141. According to some embodiments, request 211 can include a request for an encryption certificate such as a Certificate Enrollment protocol (CEP) certificate. In response, certificate authority 141 is configured to send CEP certificate 213 back to certificate manage 121. After receiving the root certificate, and RA certificates RA-EEA certificate and CEP certificate, certificate manager 121 stores these certificates at 215. In some embodiments, certificate manager 121 is configured to store the root certificate, and RA certificates RA-EEA certificate and CEP certificate, in one or more of database 127 and RA certificate 125, as shown in FIG. 1. For example, certificate manager 121 is configured to store the root certificate in database 127, and RA certificates RA-EEA certificate and CEP certificate in RA certificate 125. However, the embodiments of this disclosure are not limited to these examples, and certificate manager 121 can be configured to store the root certificate, and RA certificates RA-EEA certificate and CEP certificate, in any other manners.

According to some embodiments, based on requests and responses 203-213 and stored certificates at 215, certificate manager 121 can act as a proxy to certificate authority 141. In other words, according to some embodiments, by receiving these three certificates (root certificate, RA-EEA certificate, and CEP certificate) certificate manager 121 can obtain its authority to act as a proxy to certificate authority 141. As a proxy, certificate authority 141 can be maintained in, for example, a private network, and certificate manager 121 can be designed for tracking and managing certificates issued to client devices. Also, certificate manager 121 can validate incoming certificate requests and validate certificate issued from certificate authority 141. Certificate manager 121 can be designed for renewal of certificate, and/or certificate manager 121 can revoke certificates for a particular client device.

According to some embodiments, request and responses 203-213 and storage step 215 can be performed once, when certificate manager 121 starts its operation as the certificate manager and as the proxy to certificate authority 141. Additionally, requests and responses 203-213 and storage step 215 can be performed multiple times during the operation of certificate manager 121.

After stablishing its authority, certificate manager 121 can send a response 217 to client device 110. According to some embodiments, response 217 can include a certificate chain. For example, the certificate chain can include one or more of the root certificate, real certificates, public information regarding the authority of certificate manager 121, etc. In some example, the public information regarding the authority of certificate manager 121 can include any information that presents certificate manager 121 as the authority for, for example, issuing and revoking certificates.

According to some embodiments, client device 101 and certificate manager 121 can further communication using request 219 and response 221 regarding addition certificate capabilities of certificate manager 121. In the exemplary embodiment of FIG. 2, request 219 and response 221 are optional operations client device 101 and certificate manager 121.

Client device 110 send a public key infrastructure (PKI) operation request 223. A public key infrastructure (PKI) is a set of roles, policies, and procedures needed to create, manage, distribute, use, store, and revoke digital certificates and manage public-key encryption. By sending PKI operation request 223, client device 110 is requesting an actual certificate for itself. Although not shown, after receiving request 223 for the certificate, certificate manager 121 can be configured to authenticate client device 110 before performing additional processes. According to some embodiments, certificate manager 121 can perform any authentication process used in, for example, PKI operation to validate that client device 110 can receive its requested certificate.

After certificate manager 121 has authenticated client device 110, certificate manager 121 sends request 225 to certificate authority 141 for a certificate for client device 110. In response, certificate authority 141 sends a response 227 that includes the certificate for client device 110. At 229, certificate manager 121 encrypts the certificate for client device 110. According to some embodiments, certificate manager 121 is configured to encrypt the certificate using a client signer certificate. In some embodiments, the client signer certificate can be a certificate specific to certificate manager 121 and can be stored in database 127 when client manager 121 is designed. Additionally or alternatively, the client signer certificate can be a certificate specific to certificate manager 121 and can be sent from certificate authority 141 to certificate manager 121. According to some embodiments, certificate manager 121 can be configured to encrypt the certificate using the CEP certificate.

At 231, certificate manager 121 signs the encrypted certificate. According to some examples, certificate manager 121 signs the encrypted certificate using RA-EEA certificate. By signing the encrypted certificate, certificate manager 121 can signal its authority in managing an tracking certificate.

Certificate manager 121 sends a response 233 to client device 110, which can include the signed and encrypted certificate. At 235, client device 110 can install the certificate. According to some examples, installing the certificate can include decrypting the signed and encrypted certificate received from certificate manager 121.

Figure 3:
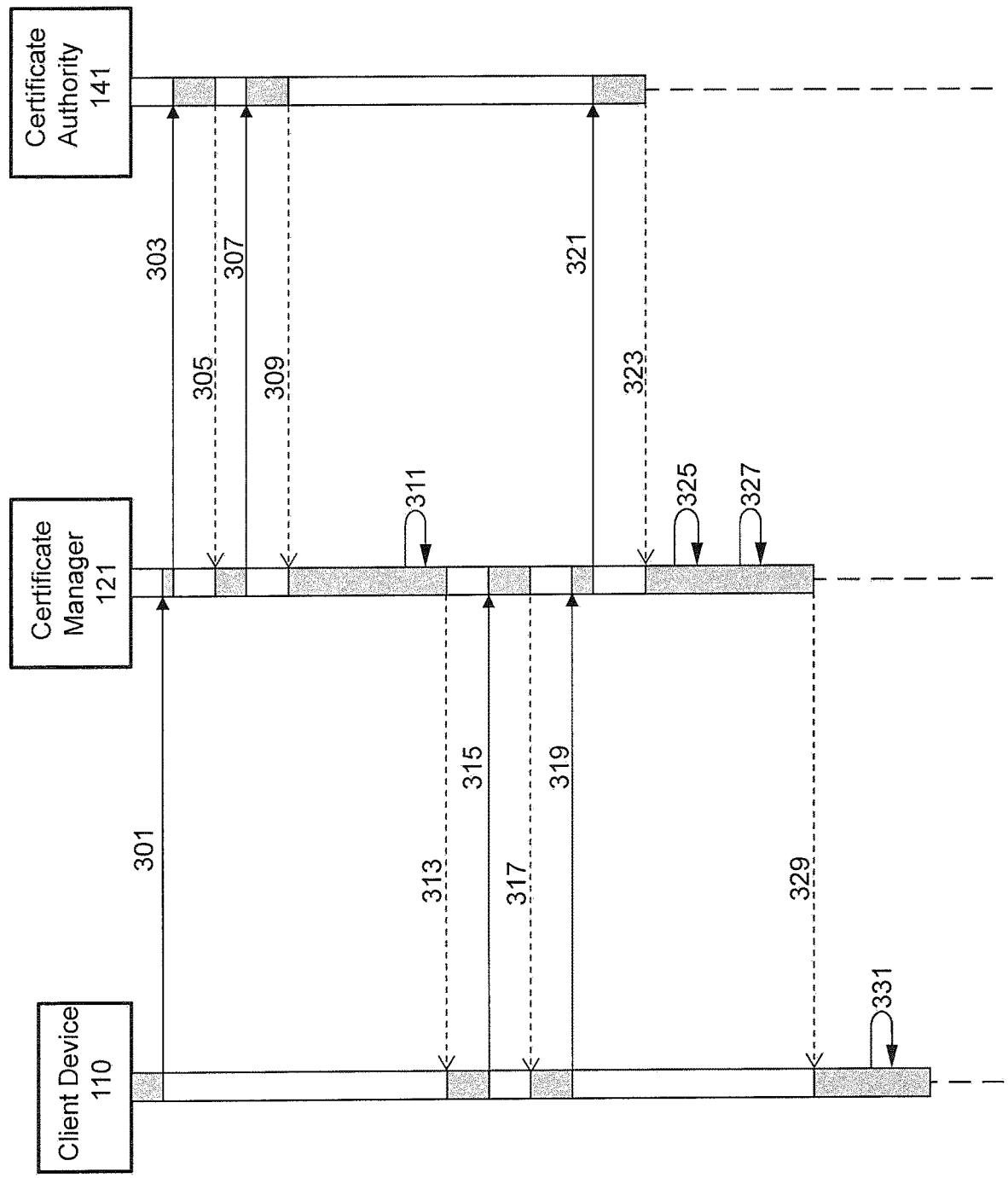
FIG. 3 is another sequence diagram describing exemplary operations of certificate manager, according to some embodiments.

FIG. 3 is a timing/sequence diagram describing exemplary operations of certificate manager, according to some embodiments. The operations of timing diagram 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

According to some embodiments, timing diagram 300 illustrates the interaction between client device 110, certificate manager 121, and certificate authority 141. Timing diagram 300 shall be described with reference to FIGS. 1-3. However, timing diagram 300 is not limited to these example embodiments.

Timing diagram 300 of FIG. 3 is similar to timing diagram 200 of FIG. 2. One exemplary difference between these two diagrams is that operations of timing diagram 200 can be performed using a native call. On the other hand, the operations of timing diagram 300 can be performed using Simple Certificate Enrollment Protocol (SCEP). SCEP is a certificate management protocol that allows users to request and issue large numbers of certificates with one request. According to some embodiments, SCEP can be used to request certificates from any SCEP-enabled certificate authority.

Similar to timing diagram 200, client device 110 sends a request 301 to certificate manager 121. According to some embodiments, request 301 can include a get certificate authority (CA) certificate request. According to some examples, request 301 initiates the process for certificate manager 121 to gain its authority to act as the proxy to certificate authority 141. After receiving the request 301, certificate manager 121 can send request 303 to certificate authority 141. According to some embodiments, request 303 can include a request to get root certificate. In one example, the request to get the root certificate can be sent by certificate manager 121 using SCEP. However, it is noted that request 303 and/or any request for root certificate can be done using other technologies and services.

After receiving request 303, certificate authority 141 sends the root certificate 305 to certificate manager 121. According to some examples, after receiving root certificate 305, certificate manager 121 can send one additional request to certificate authority 141 for one additional certificate. In some embodiments, the one additional certificates can be a registration authority (RA) certificate. For example, certificate manager 121 can send request 307 to certificate authority 141. According to some embodiments, request 307 can include a request for IPSEC (Internet Protocol Security) Intermediate Offline certificate. In response, certificate authority 141 is configured to send an RA certificate IPSEC Intermediate Offline certificate 309 back to certificate manage 121. After receiving the root certificate and IPSEC Intermediate Offline certificate, certificate manager 121 stores these certificates at 311.

In some embodiments, certificate manager 121 is configured to store the root certificate and RA certificate IPSEC Intermediate Offline certificate in one or more of database 127 and RA certificate 125, as shown in FIG. 1. For example, certificate manager 121 is configured to store the root certificate in database 127 and store the RA certificate IPSEC Intermediate Offline certificate in RA certificate 125. However, the embodiments of this disclosure are not limited to these examples, and certificate manager 121 can be configured to store the root certificate and the RA certificate IPSEC Intermediate Offline certificate in any other manners.

According to some embodiments, based on requests and responses 303-309 and stored certificates at 311, certificate manager 121 can act as a proxy to certificate authority 141. In other words, according to some embodiments, by receiving these two certificates (root certificate and IPSEC Intermediate Offline certificate) certificate manager 121 can obtain its authority to act as a proxy to certificate authority 141. As a proxy, certificate authority 141 can be maintained in, for example, a private network. Certificate manager 121 can be designed for tracking and managing certificates issued to client devices. Certificate manager 121 can validate incoming certificate requests and validate certificate issued from certificate authority 141. Also, certificate manager 121 can be designed for renewal of certificate, and/or certificate manager 121 can revoke certificates for a particular client device.

Requests, responses, and steps 313-331 in the timing diagram 300 are similar to requests, responses, and steps 217-235 in the timing diagram 200, and therefore, they are not described again here. It is noted that at 325, certificate manager 121 encrypts the certificate for client device 110. According to some embodiments, certificate manager 121 is configured to encrypt the certificate using a client signer certificate. In some embodiments, the client signer certificate can be a certificate specific to certificate manager 121 and can be stored in database 127 when client manager 121 is designed. Additionally or alternatively, the client signer certificate can be a certificate specific to certificate manager 121 and can be sent from certificate authority 141 to certificate manager 121. It is also noted that at 327, certificate manager 121 signs the encrypted certificate. According to some examples, certificate manager 121 signs the encrypted certificate using IPSEC Intermediate Offline certificate. By signing the encrypted certificate, certificate manager 121 can signal its authority in managing an tracking certificate.

FIG. 4 is a flowchart for a method 400 describing exemplary operations of a certificate manager, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to these example embodiments.

In 402, certificate manager 121 receives a first request from a client device. This first request can include request 201 of FIG. 2, request 301 of FIG. 3, and/or any other request from a client device that can trigger operations of certificate manager 121 to become a proxy to certificate authority 141. In one example, this first request can include a request from client device 110 to get a certificate. However, this first request can include any other requests from client device 110.

In 404, certificate manager 121 sends a request for root certificate to certificate authority 141. According to some embodiments, the request for root certificate can include request 203 of FIG. 2 and/or request 303 of FIG. 3. In 406, certificate manager 121 receives the root certificate from the certificate authority 141. According to some examples, receiving root certificate can include response 205 of FIG. 2 and/or response 305 of FIG. 3.

In 408, certificate manager 121 can request for additional certificate(s) from certificate authority 141. In some exemplary embodiments, the additional certificate(s) can include RA certificate(s) such as EEA certificate and/or CEP certificate as discussed above with respect to FIG. 2 and requests/responses 207-213. Additionally or alternatively, the additional certificate(s) can include an RA certificate such as IP SEC Intermediate Offline certificate as discussed above with respect to FIG. 3 and requests/responses 307-309. In 410, certificate manager 121 receives the additional certificate(s) and stores the received root certificate and any additional certificates. According to some embodiments, storing the certificates can include 213-215 of FIG. 2 and/or 309-311 of FIG. 3.

In 412, certificate authority 121 can send a certificate chain. For example, the certificate chain can include one or more of the root certificate, real certificates, public information regarding the authority of certificate manager 121, etc. Additionally or alternatively, the certificate chain can include one or more of the root certificate and any RA certificate. According to some embodiments, sending the certificate chain can include response 217 of FIG. 2 and/or 313 of FIG. 3.

In 414, certificate authority 121 receives a PKI operation request from client device 110. According to some embodiments, the PKI operation request can include request 223 of FIG. 2 and/or request 319 of FIG. 3. According to some embodiments, the PKI operation request can include a certificate service request from client device 110. The certificate service request can be issued by client device 110 when client device 110 wants to have a certificate.

In 416, certificate authority 121 can authenticate client device 110 based on the PKI operation request. In some embodiments, the authentication 416 can include checking information associated with client device 110 and/or a user of client device 110 to determine whether client device 110 is authorized to receive a certificate. According to some examples, the information associated with client device 110 and/or a user of client device 110 can include usernames, passwords, identification numbers, email addresses, client device's addresses, and any other information that can be used to authenticate client device 110 and/or a user of client device 110. It is noted that other methods can also be used to authenticate client device 110 and/or a user of client device 110.

If authenticated, in 418, certificate manager 121 can send a request to get the certificate for the client device 110 to certificate authority 141. The request for the certificate for the client device 110 can include request 225 of FIG. 2 and/or request 321 of FIG. 3.

In 420, certificate manager 121 receives the certificate for the client device 110 from certificate authority 141. In some embodiments, receiving the certificate can include response 227 of FIG. 2 and/or response 323 of FIG. 3.

In 422, certificate manager 121 encrypts the certificate for client device 110 and then signs the encrypted certificate. In some embodiments, certificate manager 121 encrypts the certificate for client device 110 and signs the encrypted certificate using one or more of additional certificates that certificate manager 121 received in 410. In some embodiments, encrypting and signing the certificate can include 229-231 of FIG. 2 and/or response 325-327 of FIG. 3.

In 424, certificate manager 121 sends the signed encrypted certificate to client device 110. In some embodiments, sending the signed encrypted certificate to client device 110 can include response 233 of FIG. 2 and/or response 327 of FIG. 3.

As discussed above, according to some embodiments, certificate manager 121 can operate as a as a proxy to certificate authority 141. Therefore, certificate authority 141 can be maintained on, for example, a private network, while certificate manager 121 can be maintained on, for example, a public network (e.g., a network accessible to public users). By acting as a proxy of certificate authority 141, certificate manager 121 can be designed for tracking and managing certificates issued to client devices, certificate manager 121 can validate incoming certificate requests and validate certificate issued from certificate authority 141, certificate manager 121 can be designed for renewal of certificate, and/or certificate manager 121 can revoke certificates for a particular client device.

Figure 5B:
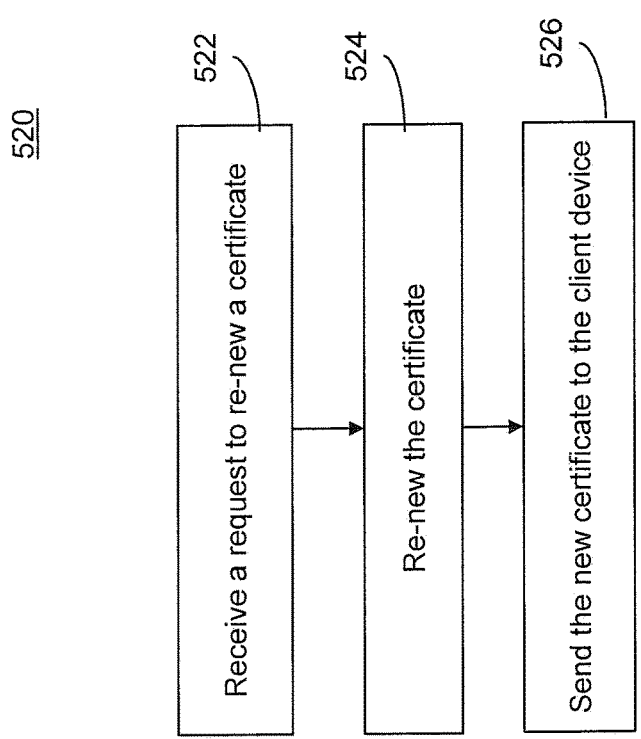
FIGS. 5A-5C are flowcharts for methods for exemplary operations of certificate manager, according to some embodiments.
Figure 5A:
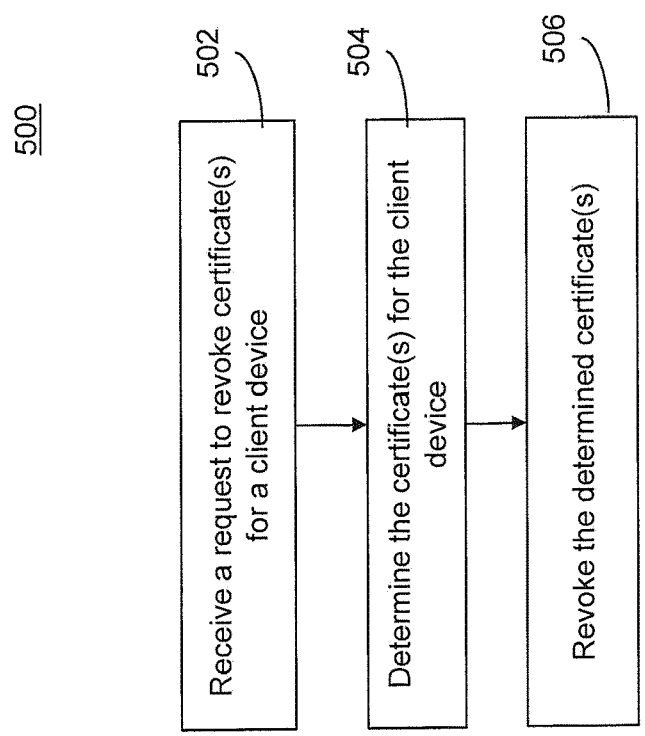
Figure 5C:
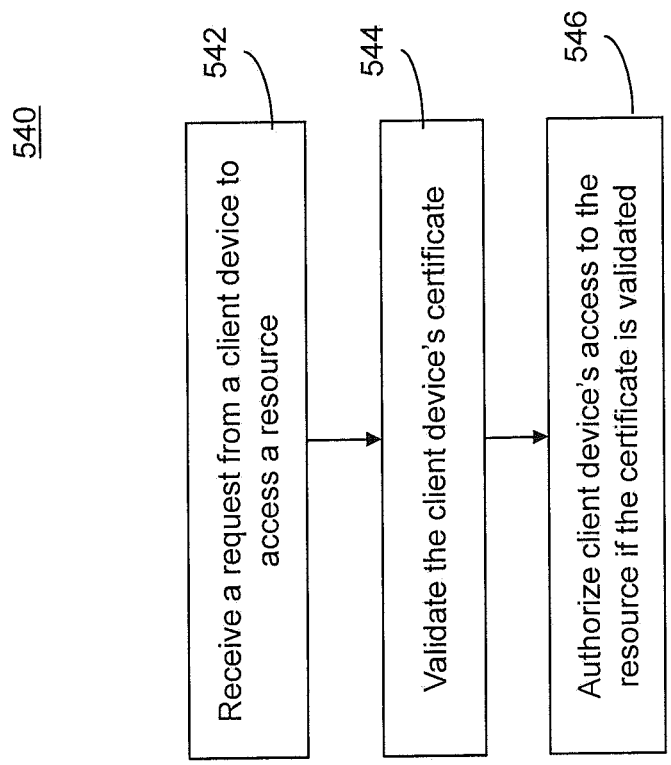

FIGS. 5A-5C are flowcharts for methods 500, 520, and 540 describing exemplary operations of certificate manager 121, according to some embodiments. Methods 500, 520, and 540 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIGS. 5A-5C, as will be understood by a person of ordinary skill in the art.

Methods 500, 520, and 540 shall be described with reference to FIGS. 1-4. However, methods 500, 520, and 540 are not limited to these example embodiments.

According to some embodiments, certificate manager 121 can be configured to revoke one or more certificate for a particular device. For example, in 502, certificate manager 121 receives a revocation request to revoke one or more certificate for a particular device. According to some examples, certificate manager 121 can receive the revocation request from an admin 117, as shown in FIG. 1. Additionally or alternatively, information associated with the client device can be changed by system 100 that would trigger a revocation request to certificate manager 121 to revoke one or more certificate of the particular client device. For example, a human resources database on system 100 (not shown) can be updated so as to indicate that the user of the particular client device is leaving the enterprise. This update on the human resources database can trigger the request to certificate authority 121 to revoke one or more certificates associated with that particular device. It is noted that other procedures and mechanisms can be used to trigger the request.

In 504, certificate manager 121 can be configured to determine the one or more certificates to be revoked. According to some embodiments, certificate manager 121 can store a mapping between the client devices and/or users of the client devices and the certificates in, for example, database 127. By storing the mapping, certificate manager 121 can be configured to track the certificates and the client devices (and/or users of client devices) that use the certificates. When certificate manager 121 receives information that a client device's certificate is to be revoked (for example, the device is lost, the user of the device is leaving the enterprise, etc.) certificate manager 121 can use the stored mapping (e.g., stored in database 127) to determine the certificate(s). For example, when client manager 121 receives information that a user is leaving the enterprise, client manager 121, using the mapping, can determine client devices that the user leaving the enterprise uses. Additionally or alternatively, client manager 121 can determine, using the mapping, one or more certificates associated with the user and/or user's client device(s).

In 506, certificate manager 121 revokes the determined certificate(s). In one example, certificate manager 121 can revoke the certificate by deleting it. Additionally or alternatively, certificate manager 121 can revoke the certificate by changing its expiration date/time to a date/time that has already passed. Additionally or alternatively, certificate manager 121 can revoke the certificate by marking the certificate as revoked. However, it is noted that certificate manager 121 can use other techniques to revoke the certificate. Optionally, when the certificate(s) is revoked, certificate manager 121 can send an acknowledgment to one or more of the entity that requested the revocation, the client devices affected, certificate authority 141, etc.

According to some embodiments, certificate manager 121 can be configured to re-new certificates. In these examples, when certificate manager 121 issues and/or sends a certificate to a client device (as discussed above), certificate manage 121 is configured to track and manage the certificate. As part of tracking and management, certificate manager 121 can be configured to store in, for example, database 127, the information associated with the certificate and its corresponding client device. For example, certificate manager 121 can be configured to store information regarding the client device and/or a user of the client device, such as but not limited to, identification numbers, employee numbers, usernames, passwords, etc. Certificate manager 121 can also be configured to store information associated with the certificate such as, but not limited to, the certificate itself, the size of the certificate, the certificate's key(s), when the certificate was issued, when the certificate was sent to a client device, when the certificate expires, etc.

According to some embodiments, in 522, certificate manager 121 can receive a request to re-new a certificate. In some embodiments, certificate manager 121 can receive the re-new request from admin 117 of FIG. 1. Additionally or alternatively, other entities on system 100 can send the request for renewal (e.g., directly from the client device with the expiring certificate). Additionally or alternatively, certificate manager 121 can periodically check the expiration date/time of its certificates, and determine when a certificate needs renewal.

In 524, certificate manager 121 can re-new the certificate. In some embodiments, certificate manager 121 can re-new the certificate itself by issuing a new certificate. Additionally or alternative, certificate manager 121 can re-new the certificate by changing the information associated with the certificate, such as, but not limited to, the time issued, the expiration time, etc. In some embodiments, certificate manager 121 can re-new the certificate by sending a request to certificate authority 141 and receiving the new certificate from certificate authority 141. However, it is noted that the embodiments of this disclosure are not limited to this examples and certificate manager 121 can use other methods to re-new the certificate.

In 526, certificate manager 121 can send the new certificate to the client device. In some embodiments, certificate manager 121 is configured to encrypt and sign the new certificate before sending it to the client device, as discussed before.

According to some embodiments, as a proxy, certificate manager 121 can also validate certificates issued by certificate manager 121 and/or certificate authority 141. In some embodiments, in 542, certificate manager 121 can receive a request from a client device to access a resource. In some embodiments, the client device, such as client device 110 can request access to one or more resources on enterprise 140. Additionally or alternatively, the request from the client device can include a certificate service request from client device 110. The certificate service request can be issued by client device 110 when client device 110 wants to have a certificate.

In 544, certificate manager 121 can receive and validate the certificate of client device 110 for accessing the one or more resources and/or for the certificate service request. In one example, the certificate can be issued using/through certificate manager 121. Additionally or alternatively, the certificate can be issued by certificate authority 141 with or without involvement of certificate manager 121. In some embodiments, the validation 544 can include checking information associated with client device 110 and/or a user of client device 110 to determine whether client device 110 is authorized to receive a certificate. According to some examples, the information associated with client device 110 and/or a user of client device 110 can include usernames, passwords, identification numbers, email addresses, client device's addresses, and any other information that can be used to authenticate client device 110 and/or a user of client device 110. It is noted that other methods can also be used to authenticate client device 110 and/or a user of client device 110.

If the certificate of client device 110 is validated, certificate manager 121 can authorize client device 110 to access the one or more resources. Additionally or alternatively, if it is determined that client device 110 is authorized to receive a certificate, certificate manager 121 can request a certificate from certificate authority 141 and forward the certificate to client device 110, as discussed above.

Figure 6:
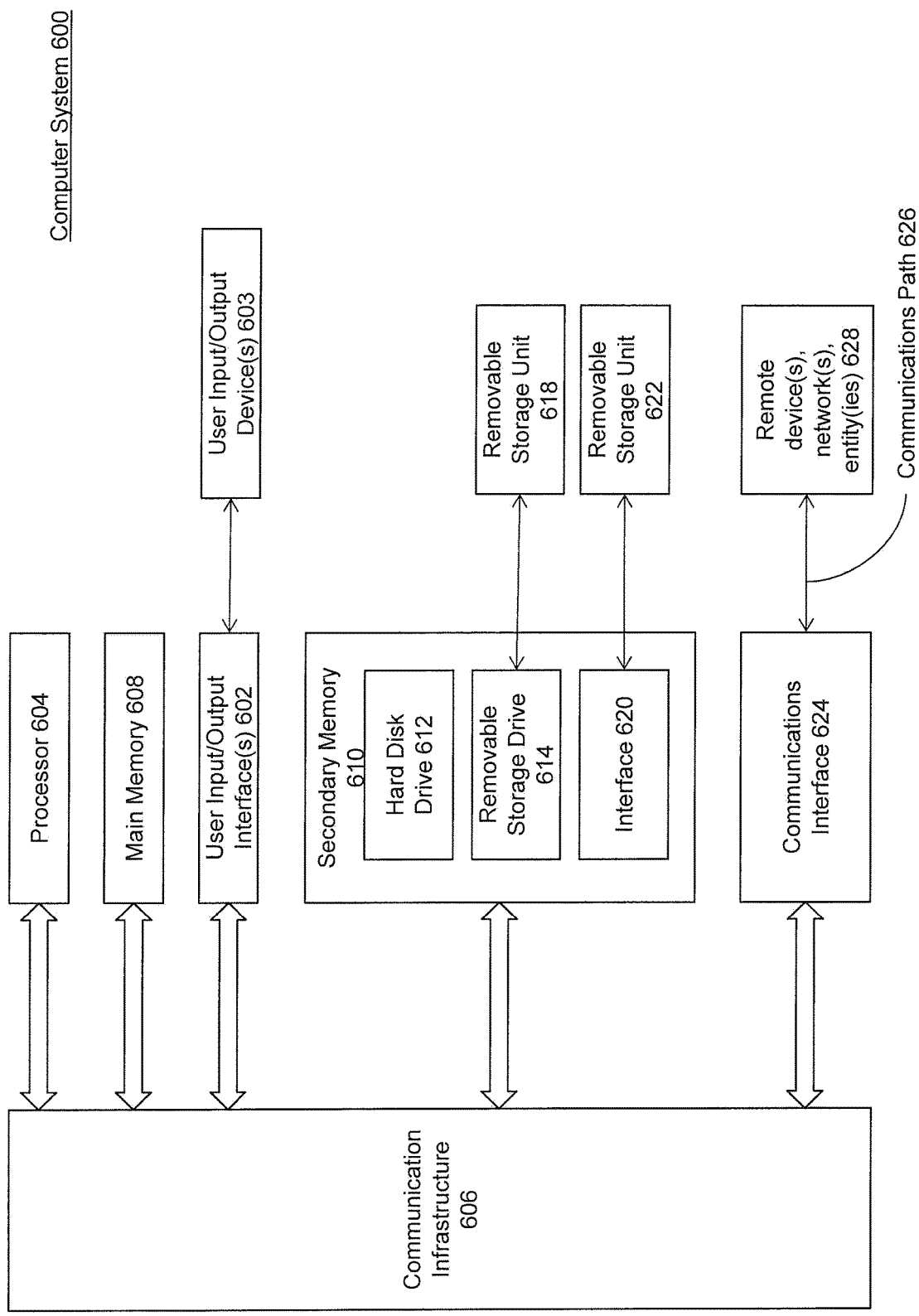
FIG. 6 is an example computer system useful for implementing various embodiments.

Various embodiments can be implemented, for example, using one or more computer systems, such as computer system 600 shown in FIG. 6. Computer system 600 can be used, for example, to implement operations of timing diagram 200 of FIG. 2, operations of timing diagram 300 of FIG. 3, method 400 of FIG. 4, and/or methods 500, 520, and/or 540 of FIGS. 5A-5C. For example, computer system 600 can perform operations of certificate manager 121 and/or any other components of system 100 as discussed with respect to FIGS. 1-4, and 5A-C, according to some embodiments. Computer system 600 can further act as a proxy of a certificate authority and can be designed for tracking and managing certificates issued to client devices, for validating incoming certificate requests and validating certificates, for renewal of certificate, and/or for revoking certificates for a particular client device, according to some embodiments. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method, comprising:
receiving, by at least one processor of a certificate manager, a first request from a client device, wherein the first request comprises a get certificate authority (CA) certificate request;
sending, by the at least one processor of the certificate manager, a second request for a root certificate to a certificate authority;
receiving, by the at least one processor of the certificate manager, a root certificate from the certificate authority, wherein the certificate manager and the certificate authority are located on different networks;
sending, by the at least one processor of the certificate manager, a third request to the certificate authority for one or more additional certificates;
receiving, by the at least one processor of the certificate manager on a proxy network to the certificate authority, the one or more additional certificates from the certificate authority;
storing, by the at least one processor of the certificate manager, the root certificate and the one or more additional certificates; and
sending, by the at least one processor of the certificate manager, a certificate chain to a client device, wherein the certificate chain comprises at least the root certificate and the one or more additional certificate.

2. The method of claim 1, further comprising:
receiving, by the at least one processor, a fourth request from the client device for a certificate for the client device;
authenticating, by the at least one processor, the client device; and
in response to the client device being authenticated, sending, by the at least one processor, a fifth request to the certificate authority for the certificate for the client device.

3. The method of claim 2, further comprising:
receiving, by the at least one processor, the certificate for the client device from the certificate authority;
encrypting, by the at least one processor, the certificate for the client device;
signing, by the at least one processor, the encrypted certificate for the client device using the one or more additional certificate; and
sending, by the at least one processor, the signed encrypted certificate to the client device.

4. The method of claim 1, further comprising:
receiving, by the at least one processor, a revocation request to revoke a certificate for the client device;
determining, by the at least one processor, the certificate for the client device; and
revoking, by the at least one processor, the certificate for the client device.

5. The method of claim 1, further comprising:
receiving, by the at least one processor, a renewal request to renew a certificate for the client device;
renewing, by the at least one processor, the certificate for the client device; and
sending, by the at least one processor, the renewed certificate to the client device.

6. The method of claim 1, wherein the proxy network comprises a public network and, wherein the certificate authority is located on an enterprise network comprising a private network.

7. The method of claim 1, wherein the sending the first request to the certificate authority for one or more additional certificates comprises:
sending the first request to the certificate authority for a first registration authority (RA) certificate; and
sending a second request to the certificate authority for a second RA certificate,
wherein the one or more additional certificates comprises the first and second RA certificates.

8. The method of claim 1, wherein the one or more additional certificate comprises a registration authority Exchange Enrollment Agent (RA-EEA) certificate and a Certificated Enrollment protocol (CEP) certificate.

9. A system, comprising:
a memory; and
at least one processor of a certificate manager coupled to the memory and configured to:
receive a first request from a client device;
send a second request for a root certificate to a certificate authority, wherein the certificate manager is located on a proxy network to the certificate authority, and the certificate manager and the certificate authority are located on different networks;
receive the root certificate from the certificate authority;
send a third request to the certificate authority for one or more additional certificates;
receive the one or more additional certificates from the certificate authority;
store the root certificate and the one or more additional certificates; and
send a certificate chain to a client device, wherein the certificate chain comprises at least the root certificate and the one or more additional certificate.

10. The system of claim 9, the at least one processor further configured to:
receive a fourth request from the client device for a certificate for the client device;
authenticate the client device; and
send a fifth request to the certificate authority for the certificate for the client device.

11. The system of claim 10, the at least one processor further configured to:
receive the certificate for the client device from the certificate authority;
encrypt the certificate for the client device using the one or more additional certificate;
sign the encrypted certificate for the client device; and
send the signed encrypted certificate to the client device.

12. The system of claim 9, the at least one processor further configured to:
receive a revocation request to revoke a certificate for the client device;
determine the certificate for the client device; and
revoke the certificate for the client device.

13. The system of claim 9, the at least one processor further configured to:
receive a renewal request to renew a certificate for the client device;
renew the certificate for the client device; and
send the renewed certificate to the client device.

14. The system of claim 9, wherein the one or more additional certificate comprises at least one of a registration authority Exchange Enrollment Agent (RA-EEA) certificate, a Certificated Enrollment protocol (CEP) certificate, or Internet Protocol Security (IPSEC) Intermediate Offline certificate.

15. A tangible computer-readable device having instructions stored thereon that, when executed by at least one computing device of a certificate manager, causes the at least one computing device to perform operations comprising:
receiving a first request from a client device;
sending a second request for a root certificate to a certificate authority, wherein the certificate manager is located on a proxy network to the certificate authority, and the certificate manager and the certificate authority are are located on different networks;
receiving the root certificate from the certificate authority;
sending a third request to the certificate authority for one or more additional certificates;
receiving the one or more additional certificates from the certificate authority;
storing the root certificate and the one or more additional certificates;
sending a certificate chain to a client device, wherein the certificate chain comprises at least the root certificate and the one or more additional certificate;
receiving a revocation request to revoke a certificate for the client device;
determining the certificate for the client device; and
revoking the certificate for the client device.

16. The computer-readable device of claim 15, the operations further comprising:
receiving a fourth request from the client device for a certificate for the client device;
authenticating the client device; and
sending a fifth request to the certificate authority for the certificate for the client device.

17. The computer-readable device of claim 16, the operations further comprising:
receiving the certificate for the client device from the certificate authority;
encrypting the certificate for the client device;
signing the encrypted certificate for the client device using the one or more additional certificate; and
sending the signed encrypted certificate to the client device.

18. The computer-readable device of claim 15, the operations further comprising receiving a renewal request to renew a certificate for the client device;
renewing the certificate for the client device; and
sending the renewed certificate to the client device.

19. The computer-readable device of claim 15, wherein the certificate authority is located on an enterprise network.

* * * * *